(12) United States Patent
Fuchigami

(10) Patent No.: US 7,759,818 B2
(45) Date of Patent: Jul. 20, 2010

(54) INTERMITTENT DRIVING SYSTEM

(75) Inventor: Takashi Fuchigami, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 68 days.

(21) Appl. No.: 12/071,122

(22) Filed: Feb. 15, 2008

(65) Prior Publication Data

US 2008/0197701 A1    Aug. 21, 2008

(30) Foreign Application Priority Data

Feb. 21, 2007    (JP)    ............................. 2007-040310

(51) Int. Cl.
*B60R 25/00*    (2006.01)
(52) U.S. Cl. .................................... 307/10.2
(58) Field of Classification Search .................. 307/9.1, 307/10.2
See application file for complete search history.

(56) References Cited

U.S. PATENT DOCUMENTS 6,043,752 A * 3/2000 Hisada et al. .............. 340/5.26
6,420,975 B1 * 7/2002 DeLine et al. ........... 340/815.4
6,950,011 B2 * 9/2005 Utter et al. ................ 340/425.5
7,391,308 B2 * 6/2008 Iwazumi ..................... 340/442

FOREIGN PATENT DOCUMENTS

JP            11-55599         2/1999
WO    WO 2007/059764         5/2007

OTHER PUBLICATIONS

European Search Report dated Jul. 21, 2008.

\* cited by examiner

*Primary Examiner*—Robert L. Deberadinis
(74) *Attorney, Agent, or Firm*—McGinn IP Law Group, PLLC

(57) ABSTRACT

An intermittent driving system includes a control target circuit to determine and notify a switching timing of ON/OFF of a power supply, and a control circuit to send a power supply ON signal for turning on the power supply or a power supply OFF signal for turning off the power supply of the control target circuit based on the switching timing decided by the control target circuit. The control target circuit is an in-vehicle monitoring circuit including a monitoring camera to monitor a in-vehicle and the control target circuit determines the switching timing based on a monitoring result of the monitoring camera.

14 Claims, 5 Drawing Sheets ature of the invention

INTERMITTENT DRIVING SYSTEM

BACKGROUND OF THE INVENTION

1. Field of the Invention

This invention relates to an intermittent driving system which is suitable for a vehicle security apparatus.

2. Description of Related Art

Recently, a wide variety of electric devices include microcomputers having CPU and peripheral circuits mounted on one large integrated circuit. In order to reduce power consumption of the electric devices, the microcomputer has HALT mode or STOP mode which is a mode for reducing amount of electric consumption. The HALT mode is the mode for working only an oscillator of the microcomputer, and deactivating other internal circuits of the microcomputer. The STOP mode is the mode for deactivating the internal circuits including the oscillator of the microcomputer. Even when the microcomputer is deactivated, the electric power is provided to the microcomputer. Therefore electric power is consumed by a leak current and so on in HALT mode or STOP mode.

Therefore the leak current has been heretofore reduced by controlling the electric power provided to the microcomputer. An example is a receiver disclosed in Japanese Unexamined Patent Application Publication No. 11-55599 (Kawabata). According to the receiver disclosed by Kawabata, when the tuner of the receiver receives a receiver stop signal from a broadcasting station, the microcomputer calculates the time to turn the power supply next time based on the stop receiver signal. Next the time to turn on the power supply next time is set in the timer. Then, the receiver is supplied with the electric power from the power supply again after the lapse of a prescribed time.

However, according to the receiver disclosed by Kawabata, ON/OFF of the power supply is switched by inputting a time schedule from an external device. For this reason, in the case where the ON/OFF of the power supply is switched frequently, the signal for switching the ON/OFF of the power supply must be constantly sent to the receiver from the external device. That is, there is a problem that it is difficult for the receiver to switch the ON/OFF of the power supply frequently.

SUMMARY

According to one aspect of the present invention, there is provided an intermittent driving system including a control target circuit to determine and notify a switching timing of ON/OFF of a power supply, and a control circuit to send a power supply ON signal for turning on the power supply or a power supply OFF signal for turning off the power supply of the control target circuit based on the switching timing decided by the control target circuit.

According to the present invention, since the intermittent. driving system has the control target circuit to determine and notify a switching timing of ON/OFF of a power supply and the control circuit turns ON or turns OFF the power supply of the control target circuit based on the determined switching timing, the intermittent driving system can automatically control the ON/OFF of the power supply of the control target circuit without being externally controlled.

According to the present invention, there is provided an intermittent driving system which can automatically turn ON or OFF the power supply depending on the situation of a control target circuit.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF REFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

First Embodiment

The specific embodiment to which the present invention is applied will now be described in detail with reference to the drawings. In the embodiments of the present invention, an intermittent driving system of this invention is applied to a vehicle security apparatus. The vehicle security apparatus detects the presence or absence of a person in a vehicle and determines the presence or absence of an abnormality while the vehicle (automobile or car) is stopped. Then, when the vehicle security apparatus determines abnormality by detecting a person, the vehicle security apparatus is controlled so as to set off sirens at an external device which is connected to the vehicle security apparatus. According to the present invention, a power supply of an in-vehicle monitoring circuit 20, as mentioned later, of the vehicle security apparatus is turned ON at every five minutes interval, for example, after the vehicle is stopped and a door is locked, then the in-vehicle monitoring circuit 20 detects the presence or absence of the person in the vehicle to determine the presence or absence of abnormality in the vehicle.

Figure 1:
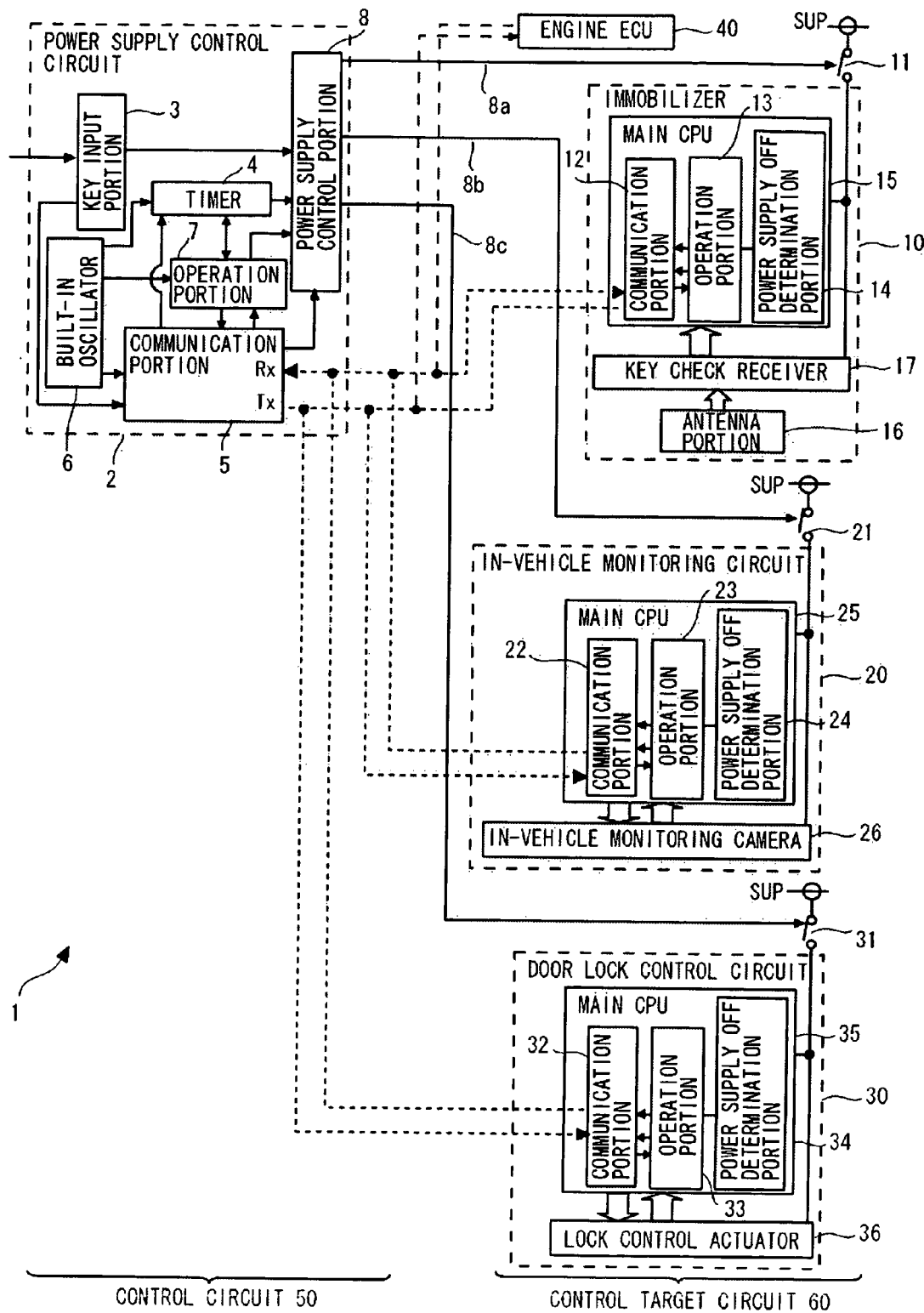
FIG. 1 is a block diagram showing a vehicle security apparatus according to a first embodiment of the present invention.

FIG. 1 is a block diagram showing a vehicle security apparatus according to a first embodiment of the present invention. As shown in FIG. 1, a vehicle security apparatus 1 includes a control circuit 50 and a control target circuit 60 controlled by the control circuit 50. The control target circuit 60 determines a switching timing of ON/OFF of a power supply depending on the situation and notifies the control circuit 50. The control circuit 50 sends to a control target circuit 60 a power supply ON signal which turns on the power supply or a power supply OFF signal which turns off the power supply of the control target circuit 60 based on a timing which is determined by the control signal. Here, according to the embodiment, the control circuit 50 has a power supply control circuit 2. The control target circuit 60 includes an immobilizer 10, an in-vehicle monitoring circuit 20, and a door lock control circuit 30. The in-vehicle monitoring circuit 20 checks the presence or absence of a person in a vehicle. The power supply control circuit 2 controls power ON/OFF of the control target circuit 60 which include the in-vehicle monitoring circuit 20. The vehicle security apparatus 1 is connected to an engine ECU (Engine Control Unit) 40. The engine ECU 40 controls an ON/OFF of an engine. The in-vehicle monitoring circuit 20 determines the presence or absence of abnormality based on the presence or absence of a person in the vehicle for example, and the engine ECU 40 receives the result of the determination. According to the received result of the determination, the vehicle security apparatus 1 sets off sirens and notifies a user of the abnormality. The immobilizer 10 and the door lock control circuit 30 are described below.

Hereinafter each component is described further in detail. First, a constitution of the power supply control circuit 2 will be described. The power supply control circuit 2 includes a key input portion 3, a timer 4, a communication portion 5, a built-in oscillator 6, an operation portion 7, and a power supply control portion 8. A switching signal (hereinafter referred to as a door lock signal or a door unlock signal) of a door of a vehicle is input to the key input portion 3 through a key from user.

The communication portion 5 stores ID which is given to the control target circuit 60 which is connecting to the communication portion 5. The communication portion 5 sends the door unlock signal to the door lock control circuit 30. When a receiver (Rx) of the communication portion 5 receives a power supply ON signal which turns on the power supply, the receiver further receives ID of the control target circuit 60. When the receiver receives a power supply OFF signal which turns off the power supply, the receiver further receives ID of the control target circuit 60 and a time which is a next starting time of the control target circuit 60. When the receiver receives the power supply OFF signal or the power supply ON signal, the receiver selects a signal (for example, the power supply OFF signal for the control target circuit) which controls the behavior of the control target circuit 60 whose ID corresponds to the received ID from among the IDs of the control target circuit 60 which is stored in the communication portion 5 and sends the selected signal to the power supply control portion 8. The communication portion also sends next starting time of the control target circuit 60 which is received and the ID of the control target circuit 60 to the timer 4.

The timer 4 includes a clock and a built-in buffer (not shown) as a memory. The built-in buffer stores the next starting time of the control target circuit 60 received by the communication portion 5 and the ID of the control target circuit 60. When the clock receives the next starting time of the control target circuit 60, the clock counts an elapsed time since the next starting time is received. Then the timer 4 sends the time counted by the clock, the next starting time of the control target circuit 60 stored by the built-in buffer, and the ID to the operation portion 7.

The operation portion 7 receives the ID of the control target circuit 60 and the next starting time of the control target circuit 60 from the built-in buffer of the timer 4 and the time counted by the clock from the clock of the timer 4. Then the operation portion 7 determines whether the time counted by the clock of timer 4 corresponds to the time stored in the built-in buffer of the timer 4. If both time lengths correspond to each other, the ID of the control target circuit 60 which is to be started and the power supply ON signal are sent to the power supply control portion 8 in order to turn on the power supply of the control target circuit 60 which is to be started.

The power supply control portion 8 receives the ID of the control target circuit 60 which is to be started and the power supply ON signal from the operation portion 7. Then the power supply control portion 8 sends the power supply ON signal in order to turn on the power supply of the control target circuit 60 which is to be started. The power supply control portion 8 receives the signal such as the power supply OFF signal which is sent to the control target circuit 60 which is requested to turn off the power supply. The power supply control portion 8 sends the power supply OFF signal to the control target circuit 60 which is requested to turn off the power supply. The built-in oscillator 6 supplies a clock to the timer 4 and the communication portion 5 of the power supply control circuit 2.

Next, the constitution of the in-vehicle monitoring circuit 20 will be described. The in-vehicle monitoring circuit 20 includes a switch 21, a main CPU 25 having a communication portion 22, an operation portion 23, and a power supply OFF determination portion 24, and an in-vehicle monitoring camera 26. The switch 21 is connected to the power supply control circuit 8 of the control circuit so through a control signal line 8*b* and switches the ON/OFF of the power supply of the in-vehicle monitoring circuit 20. That is, the switch 21 receives the power supply ON signal or the power supply OFF signal from the power supply control circuit 2. Then the switch 21 is connected or disconnected by the received signal, and ON/OFF of the power supply of the in-vehicle monitoring circuit 20 is switched.

The in-vehicle monitoring camera 26 takes an image of an in-vehicle condition and sends the video signal to the main CPU 25 which is microcomputer. The main CPU 25 controls the in-vehicle monitoring camera 26.

The operation portion 23 analyzes the in-vehicle image taken by the in-vehicle monitoring camera 26, and determines the presence or absence of the abnormality based on the presence of absence of a person in the vehicle. While the vehicle is stopped and the door is locked, the operation portion 23 determines the case where a person is detected by the in-vehicle monitoring camera 26 is abnormal, and the case where the person is not detected by the in-vehicle monitoring camera 26 is normal. The operation portion 23 sends the determination result to the communication portion 22. The communication portion 22 receives the determination result of the presence or absence of the abnormality. Then the communication portion 22 sends the power supply ON signal or the power supply OFF signal to the power supply control circuit 2 based on the determination result. The communication portion 22 has built-in memory (not shown), and the built-in memory stores ID of the in-vehicle monitoring circuit 20. For example, ID of the in-vehicle monitoring circuit 20 is 2. The ID can be arbitrarily changed. The ID is sent to the power supply control circuit 2 with the power supply ON signal or the power supply OFF signal.

The power supply OFF determination portion 24 decides whether or not the power supply of the in-vehicle monitoring circuit 20 is turned off. For example, when the vehicle is driving (the engine is on), since the person is in the vehicle, the in-vehicle monitoring camera 26 does not need to monitor the in-vehicle whether the person is absent in the vehicle or not. That is, the in-vehicle monitoring circuit 20 does not need to be operated while driving. As just described, the power supply OFF determination portion 24 decides whether the power supply of the in-vehicle monitoring circuit 20 is turned off while driving. However, when the in-vehicle monitoring circuit 20 is used as a occupant detection device which checks the occupant's seat position in the vehicle in order to determine whether an airbag is operating or not, the power supply of the in-vehicle monitoring circuit 20 is turned on even if the engine is ON.

Figure 2:
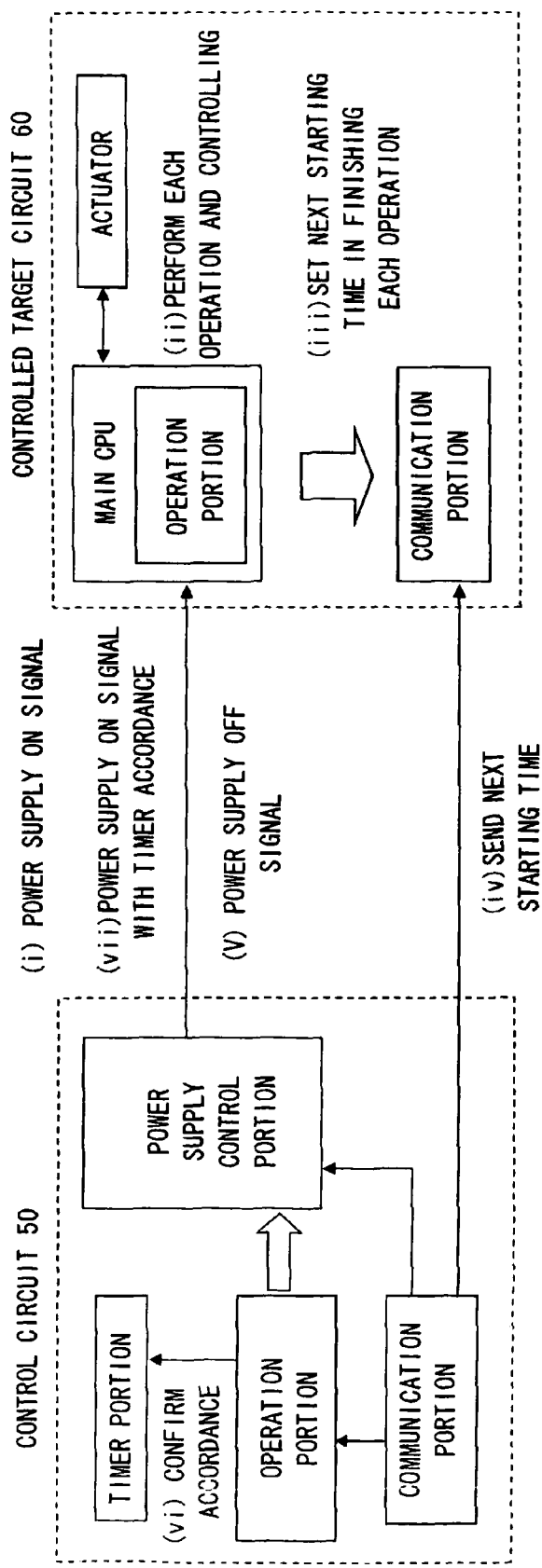
FIG. 2 is a schematic diagram showing an in-vehicle monitoring circuit of the vehicle security apparatus used as a control target circuit control target circuit according to the first embodiment of the present invention.
Figure 3:
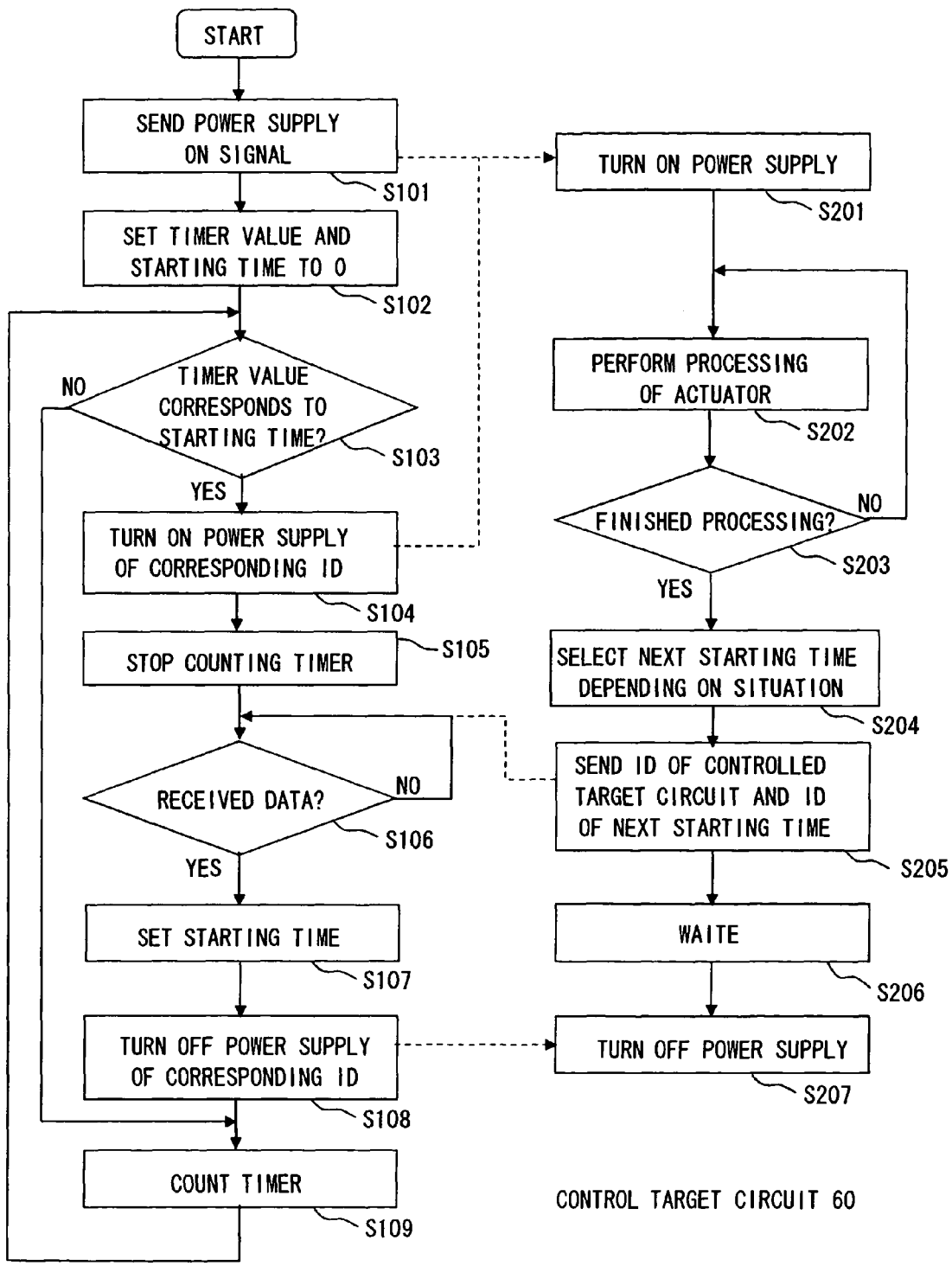
FIG. 3 is a flow chart showing a schematic behavior of a control circuit and a control target circuit.

Next, the outline of the operation of the control circuit 50 including the power supply control circuit 2 and the control target circuit 60 including the in-vehicle monitoring circuit 20 will be described with reference to FIG. 2 and FIG. 3. FIG. 2 is a schematic diagram showing a case where the next starting time of the in-vehicle monitoring circuit 20 is sent to the power supply control circuit 2 from the in-vehicle monitoring circuit 20. FIG. 3 is a flow chart showing a schematic behavior of FIG. 2. According to FIG. 3, the left chart is a flow chart showing the behavior of the control circuit 50 including the power supply control circuit 2, and the right chart is a flow chart showing the behavior of the control target circuit 60 including the in-vehicle monitoring circuit 20. As stated above, the in-vehicle monitoring circuit 20 turns off the power supply while driving. Therefore the behavior of the in-vehicle monitoring circuit 20 while the vehicle is stopped will be hereinafter described.

As shown in FIG. 2 and FIG. 3, a user stops the vehicle first. Then the user locks the vehicle. Herewith the door lock signal of the vehicle is sent to the key input portion 3 of the power supply control circuit 2 by user. When the door lock signal is inputted to the power supply control circuit 2, the power supply control circuit 2 is turned on. The door lock signal is sent to the power supply control portion 8 from the key input portion 3. Then the power supply control portion 8 sends the power supply ON signal to the in-vehicle monitoring circuit 20 in order to check whether the person is in the vehicle (see FIG. 2(i), step S101). As previously discussed, the power supply of the in-vehicle monitoring circuit 20 of the vehicle security apparatus 1 of the embodiment is turned on every 5 minutes and the in-vehicle monitoring circuit 20 detects whether a person is in the vehicle. However the interval time (in this case, the interval time is 5 minutes) starting up the in-vehicle monitoring circuit 20 has not been decided yet. Namely, the next starting time of the in-vehicle monitoring circuit 20 is not stored in the timer 4 of the power supply control circuit 2 (step S102). The next starting time of the in-vehicle monitoring circuit 20 is described later.

The switch 21 is connected to the power supply by a control signal from the control signal line 8b connected to the power supply control portion 8 of the power supply control circuit 2, and the power supply is supplied to the in-vehicle monitoring circuit 20 (the power supply turns ON) (step S201). Next, the in-vehicle monitoring circuit 20 takes an in-vehicle image. Then an operation portion 23 analyzes the result of taken images and determines the presence or absence of abnormality based on the presence or absence of a person in a vehicle (step S202). Further, the in-vehicle monitoring circuit 20 determines whether it is finished taking an image of the in-vehicle interior with the monitoring camera 26 and determining the presence or absence of abnormality by the operation portion 23 (step S203). If taking an in-vehicle image and determining the presence or absence of abnormality are not finished, the operation goes back to the step S202 again, and taking an in-vehicle image and determining the presence or absence of abnormality are performed. On the other hand, when it is finished taking an in-vehicle image and determining the presence or absence of abnormality, the operation portion 23 of the in-vehicle monitoring circuit 20 decides the next starting time (the timing for switching ON or OFF of the power supply) of the in-vehicle monitoring circuit 20 based on the determination result (FIG. 2 (ii), step S204), and the decided time is sent to the communication portion 22 of the in-vehicle monitoring circuit 20 (FIG. 2 (iii)).

Here a plurality of IDs indicating the interval time of the next starting time of the in-vehicle monitoring circuit 20 are preliminarily stored in the operation portion 23 of the in-vehicle monitoring circuit 20. For example, when the ID is A, B, and C, the next starting time is in 5 minutes, 1 minute, and 30 seconds, respectively. When the ID is D, the in-vehicle monitoring circuit 20 continues normal operation. For example, the operation portion 23 of the in-vehicle monitoring circuit 20 determines that it is normal when a person is not detected by checking the in-vehicle while the door is locked and the vehicle stops. In this case, the in-vehicle monitoring circuit 20 sends ID (2) of the in-vehicle monitoring circuit 20 and the signal (ID=A) to the power supply control circuit 2. The signal (ID=A) is the signal to turn off the power supply of the in-vehicle monitoring circuit 20 because of determining normality and to start up the in-vehicle monitoring circuit 20 in 5 minutes next time. That is, 2A is sent to the power supply control circuit 2 as ID. On the other hand, when the operation portion 23 of the in-vehicle monitoring circuit 20 detects a person by checking the vehicle interior while the vehicle is stopped and the door is locked, the operation portion 23 determines abnormality. In this case, the in-vehicle monitoring circuit 20 sends ID (2) of the in-vehicle monitoring circuit 20 and the signal (ID=B) to the power supply control circuit 2. The signal (ID=B) is the signal to turn off the power supply of the in-vehicle monitoring circuit 20 and to start up the in-vehicle monitoring circuit 20 in 1 minute next time because of detecting a person. In this case, 2B is sent to the power supply control circuit 2 as ID. In this example, when the operation portion 23 detects a person in the vehicle and determines abnormality while the vehicle stops, the next starting time of the in-vehicle monitoring circuit 20 is set to 1 minute. However the next starting time may be arbitrarily changed as long as it is shorter than the next starting time in the case where the operation portion 23 does not detect a person and determines normality. When a person is detected in the vehicle while the vehicle is stopping, as described later, the power supply control circuit 2 makes the other control target circuit such as the immobilizer 10 and door lock control circuit 30 operate corresponding to the motion of the in-vehicle monitoring circuit 20. That is, the in-vehicle monitoring circuit 20 sends the signal to start up all control target circuits 60 in synchronization with the in-vehicle monitoring circuit 20. As stated, the ID indicating the next starting time selected by the in-vehicle monitoring circuit 20 and the ID of the in-vehicle monitoring circuit 20 (for example 2A or 2B) are sent to the power supply control circuit 2 (FIG. 2 (iv), step S205). Here, the in-vehicle monitoring circuit 20 waits until receiving the signal from the power supply control circuit 2 (step S206).

The communication portion 5 of the power supply control circuit 2 which receives ID of the in-vehicle monitoring circuit 20 and ID of the next starting time sends the signal to the power supply control portion 8. The signal controls the motion of the control target circuit 60 (here, the control target circuit is the in-vehicle monitoring circuit 20) whose ID corresponds to the received ID selected from among IDs of the control target circuit 60 which are stored. The communication portion 5 stores the received ID and ID of next starting time in the built-in buffer of the timer 4 (step S107). The power supply OFF signal is sent to the control target circuit 60 through the control signal line 8b from the power supply control portion 8 based on the signal received from the communication portion 5. In this example, the power supply OFF signal is sent to the in-vehicle monitoring circuit 20 through the control signal line 8b from the power supply control portion 8 (FIG. 2(v), step S108). The switch 21 of the in-vehicle monitoring circuit 20 is turned off and the power supply is turned off based on the power supply OFF signal which is sent by the power supply control portion 8 through the control signal line 8b (step S207). The clock of the timer 4 starts to count an elapsed time after storing the ID of the next starting time in step S107 (step S109). Then the operation portion 7 determines whether the time corresponding with the ID of the next starting time stored in the built-in buffer of the timer 4 accords with the time counted by the clock of the timer 4. If they accord (FIG. 2 (vi), step S103), the operation portion 7 sends the power supply ON signal of the in-vehicle monitoring circuit 20 to the power supply control portion 8, and the power supply control portion 8 sends the power supply ON signal to the in-vehicle monitoring circuit 20 (FIG. 2 (vii), step S104). Then the timer 4 stops counting (step S105). If the time corresponding to the ID of the next starting time stored in the timer 4 does not accord with the counted time, the operation goes back to step S109 again, and the timer 4 counts the elapsed time. If they accord, the operation goes back to step S104. After the power supply control circuit 2 stops the counting by the timer 4 in step S105, the power supply control circuit 2 determines whether the power supply control circuit 2 has received the ID of the in-vehicle monitoring circuit 20 and the selected ID of the next starting time of the in-vehicle monitoring circuit 20 (step S106). When the power supply control circuit 2 receives the ID of the in-vehicle monitoring circuit 20 and so on, the timer 4 of the power supply control circuit 2 stores the ID of the next starting time of the in-vehicle monitoring circuit 20 in step S107. The following operations are the same as the operations that come after step S108.

The vehicle security apparatus 1 of the embodiment includes the in-vehicle monitoring circuit 20 which monitors whether a person is in the vehicle, and the power supply control circuit 2 which controls the on/off of the power supply of the in-vehicle monitoring circuit 20. The vehicle security apparatus 1 further includes the immobilizer 10 and the door lock control circuit 30 described later. The in-vehicle monitoring circuit 20 includes the operation portion 23 which analyzes the taken an image and determines whether there is abnormality based on the existence or non-existence of a person in the vehicle. The next starting time of the in-vehicle monitoring circuit 20 is determined based on the determination result of the operation portion 23. More specifically, the interval of the starting time of the in-vehicle monitoring circuit 20 is not unilaterally sent from a device external to the in-vehicle monitoring circuit 20, but the in-vehicle monitoring circuit 20 itself can change the next starting time arbitrarily based on the determination result of the in-vehicle monitoring circuit 20. The in-vehicle monitoring circuit 20, which is included in the control target circuit 60, can change the starting time according to the environment. If the operation portion 23 determines abnormality, the in-vehicle monitoring circuit 20 can make the internal time until the next starting time of the in-vehicle monitoring circuit 20 shorter than in the case where the operation portion 23 determines normality. The in-vehicle monitoring circuit 20 itself can send the power supply ON/OFF signal, so the switching signal which turns ON/OFF the power supply is not needed to be sent from the external device. In the embodiment, the in-vehicle monitoring circuit 20 operates while the vehicle stops. That is, it is possible to reduce the power consumption by turning OFF the power supply of the in-vehicle monitoring circuit 20 while the vehicle is driven.

Next, the case where the user turns ON the engine of the vehicle will be described. As described above, the control target circuit 60 of the vehicle security apparatus 1 of the embodiment includes the immobilizer 10 which determines whether ID of the key corresponds to ID of the vehicle when the user turns on the engine and the door lock control circuit 30 which controls a switching of a door lock of the vehicle. Now, the immobilizer 10 and the door lock control circuit 30 will be described in detail with reference to FIG. 1.

First, the constitution of the immobilizer 10 will be described. As shown in FIG. 1, the immobilizer 10 includes a switch 11 and a main CPU 15 which has a communication portion 12, a power supply OFF determination portion 14, and an operation portion 13. The immobilizer 10 further includes an antenna portion 16 which receives ID of a key sent from a key when the user starts the vehicle, and a key check receiver 17 which converts the ID of key into numeric information.

The switch 11 is connected to the power supply control portion 8 of the control circuit 50 through the control signal line 8a. The switch 11 is switched based on the power supply ON/OFF signal sent from the power supply control circuit 2 which is the control circuit 50, and the switch 11 switches the ON/OFF of the power supply of the immobilizer 10. More specifically, the switch 11 is connected by the power supply ON signal sent from the power supply control portion 8 of the power supply control circuit 2 through the control signal line 8a, which means the immobilizer 10 is supplied with the power supply. The switch 11 is also disconnected by the power supply OFF signal sent from the power supply control portion 8 of the power supply control circuit 2 through the control signal line 8a. Herewith the immobilizer 10 is not supplied with the power supply.

The antenna portion 16 receives the ID of the key when the user starts the engine and sends the IS of the key to the main CPU 15 through the key check receiver 17.

The operation portion 13 of the main CPU 15 stores the ID of the vehicle which mounts the vehicle security apparatus 1 of the embodiment and makes an ID accordance determination which determines whether the ID of key corresponds to the ID of the vehicle. Here, the operation portion 13 determines that it is abnormal if the IDs do not accord. When the operation portion 13 determines it is abnormal, the operation portion 13 sends the abnormal signal to the engine ECU 40 through the communication portion 12. The engine ECU 40 which receives the abnormal signal sets off sirens to inform the abnormality. On the other hand, when the IDs accord, the operation portion 13 sends an engine ON signal to the engine ECU 40 through the communication portion 12, then the engine starts.

The communication portion 12 sends an abnormal signal to the engine ECU 40 based on a determination result of the presence or absence of an abnormality which the operation portion 13 makes. The communication portion 12 has a built-in memory (not shown). The built-in memory stores the ID of the immobilizer 10. For example, the ID of the immobilizer 10 is 1, but the ID can be arbitrarily changed.

The power supply OFF determination portion 14 determines whether the power supply of the immobilizer 10 is turned off or not. For example, while the vehicle is driven, it has already been confirmed that the IDs accord to each other. That is, while the vehicle is driven, the power supply OFF determination portion 14 does not need to make the ID accordance determination again. As mention above, the power supply OFF determination portion 14 determines to turn OFF the power supply of the immobilizer 10 while the vehicle is driven.

Next, the constitution of the door lock control circuit 30 will be described. As shown in FIG. 1, the door lock control circuit 30 includes a switch 31 and a main CPU 35 having a communication portion 32, a power supply OFF determination portion 34, and an operation portion 33. The door lock control circuit 30 further includes a lock control actuator 36 for example.

The switch 31 is connected to the power supply control portion 8 of the control circuit 50 through the control signal line 8c. The switch 31 is switched based on the power supply ON/OFF signal sent from the power supply control circuit 2 which is the control circuit 50. More specifically, the switch 31 is connected based on the power supply ON signal sent from the power supply control circuit 2 through the control signal line 8c, then the door lock control circuit 30 is supplied with the power supply. The switch 31 is cut off based on the power supply OFF signal sent from the power supply control circuit 2 through the control signal line 8c. Herewith the door lock control circuit 30 is not supplied with the power supply. The lock control actuator 36 is a motor to open or close the door.

The main CPU 35 controls the lock control actuator 36. The operation portion 33 detects a condition that a door is unlocked or a door is locked which is controlled by the lock control actuator 36 and stores records of the condition of the door. Then the operation portion 33 sends the detection result to the communication portion 32. For example, the communication portion 32 sends the power supply ON signal to the power supply control circuit 2 in order to turn on the power supply of the immobilizer 10 by the detection result of condition that the door is unlocked which is detected by the operation portion 33. Further the communication portion 32 receives a door unlock signal and so on from the power supply control circuit 2. The communication portion 32 further includes a built-in memory (not shown) and the built-in memory stores the ID of the door lock control circuit 30. Here the ID of the door lock control circuit 30 is 3, but the ID can be arbitrarily changed.

The power supply OFF determination portion 34 determines whether the power supply of the door lock control circuit 30 is turned off or not. For example, locking/unlocking of the door is not performed while the vehicle is driven. As mention above, the power supply OFF determination portion 34 determines whether the power supply of the door lock control circuit 30 is turned off while the vehicle is driven. Herewith the power consumption can be reduced.

Figure 4:
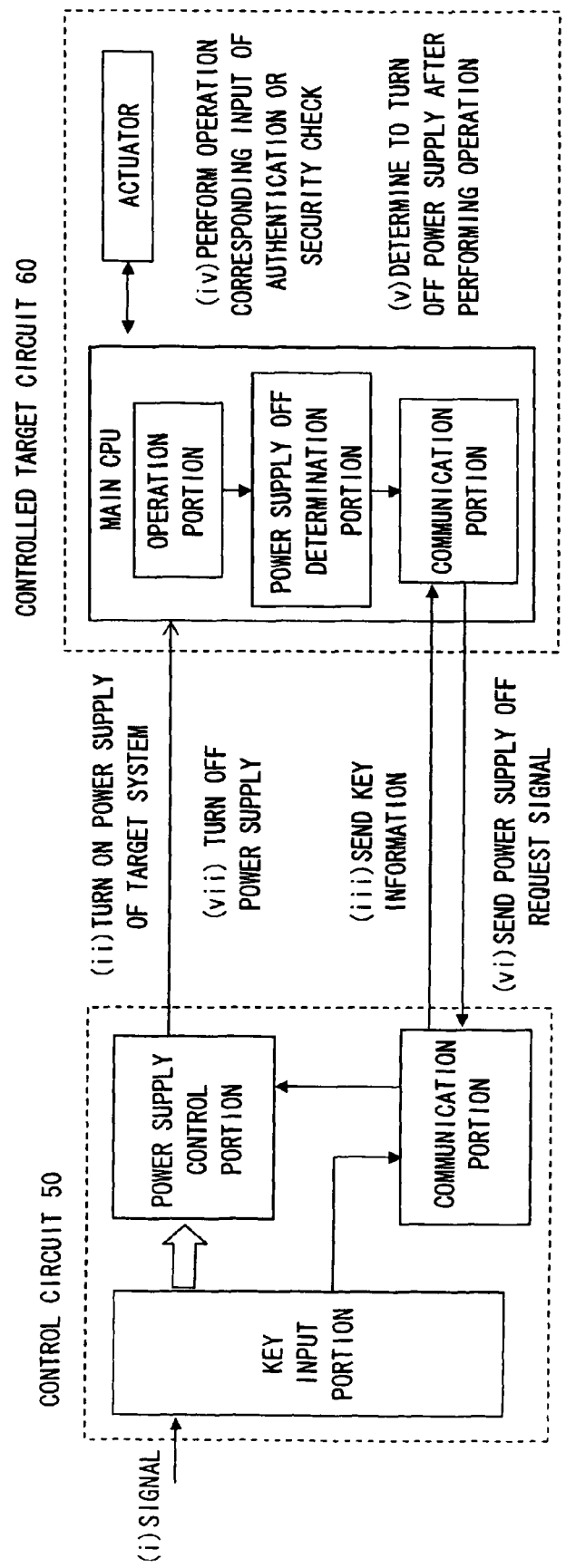
FIG. 4 is a schematic diagram showing an immobilizer and a door lock control circuit according to an embodiment of the present invention.

Next, the operation of the vehicle security apparatus 1 will be described when the user turns on the engine of the vehicle. FIG. 4 is a schematic diagram showing the behavior of the immobilizer 10 and the door lock control circuit 30. As shown in FIG. 4, firstly the user opens the door of the vehicle when the vehicle is stopped. More specifically, a door unlock signal is sent to the vehicle security apparatus 1 from the key by user. Then the key input portion 3 of the power supply control circuit 2 of the vehicle security apparatus 1 receives the door unlock signal (see FIG. 4(i)). The door unlock signal (KEY information) is sent to the power supply control portion 8 and the communication portion 5 of the power supply control circuit 2 which is the control circuit 50. The power supply control portion 8 receives the door unlock signal and sends a power supply ON signal to the door lock control circuit 30 through the control signal line 8c (see FIG. 4(ii)). Then the switch 31 is connected and the power supply of the door lock control circuit 30 is turned on. The communication portion 5 of the power supply control circuit 2 sends the door unlock signal to the communication portion 32 of the door lock control circuit 30 (see FIG. 4(iii)). When the door lock control circuit 30 receives the door unlock signal, the operation portion 33 detects whether the door is locked. When the door is locked, the lock control actuator 36 unlocks the door (see FIG. 4(iv)). At this time, the power supply ON signal of the immobilizer 10 is sent to the communication portion 5 of the power supply control circuit 2 from the communication portion 32 of the door lock control circuit 30 (not shown). Then the power supply control portion 8 of the power supply control circuit 2 sends the power supply ON signal to the immobilizer 10 through the control signal line 8a. Then the switch 11 of the immobilizer 10 is connected, and the power supply of the immobilizer 10 is turned on. The immobilizer 10 receives ID of key and so on with the antenna portion 16 when user turns on the engine and the immobilizer 10 sends the ID of key to the main CPU 15 through the key check receiver 17. The operation portion 13 of the main CPU 15 determines whether or not the ID of key which is received corresponds to the ID of the vehicle which is stored.

If the IDs accord to each other, an engine ON signal is sent to the engine ECU 40 and then the engine is turned on. If the IDs do not accord to each other, the operation portion 13 determines it is abnormal, and an abnormal signal is sent to the engine ECU 40. The engine ECU 40 which receives the abnormal signal informs the user of the abnormality by the hazard lighting or alarm. When the engine starts and the vehicle is driven, the power supply OFF determination portion 14 of the immobilizer 10 and the power supply OFF determination portion 34 of the door lock control circuit 30 determine whether the power supply of the circuit is turned on or not, respectively (see FIG. 4(v)). As described above, while the vehicle is driven, the immobilizer 10 and the door lock control circuit 30 do not operate. Herewith each power supply OFF determination portion sends the power supply OFF signal and ID of each circuit to the communication portion of the power supply control circuit 2 (see FIG. 4(vi)). The communication portion 5 sends the signal to the power supply control portion 8. The signal controls the control target circuit 60 (in this case, the control target circuits are the immobilizer and the door lock control circuit 30) whose ID corresponds to the received ID from among the IDs of the control target circuit 60 which are stored in a built-in memory (not shown). The power supply control portion 8 sends the power supply OFF signal to the control target circuit 60 based on the signal which is received from the communication portion 5. That is, the power supply OFF signal is sent to the immobilizer 10 and the door lock control circuit 30 from the power supply control portion 8 (see FIG. 4(vii)). Then the power supplies of the immobilizer 10 and the door lock control circuit 30 are turned off.

As stated above, in this embodiment, in a case where the user turns on the engine, the power supply ON signal is sent to the door lock control circuit 30 from the power supply control portion 8 of the power supply control circuit 2 through control signal line 8c by the door unlock signal. Then the switch 31 is connected and the power supply is supplied to the door lock control circuit 30 (the power supply is turned on). The door lock control circuit 30 sends the power supply ON signal of the immobilizer 10 to the power supply control circuit 2. Then the power supply control portion 8 of the power supply control circuit 2 sends the power supply ON signal to the immobilizer 10, the switch 11 of the immobilizer 10 is connected, and the immobilizer 10 is supplied with the power supply (the power supply is turned on). Further, although the operation portion 23 of the in-vehicle monitoring circuit 20 determines the abnormality when a person is detected in the vehicle, the immobilizer 10 and the door lock control circuit 30 start up according to the behavior of the in-vehicle monitoring circuit 20.

Here, the operation in a case where the immobilizer 10 and the door lock control circuit 30 are started will be described. When the operation portion 23 of the on-vehicle monitoring circuit 20 determines abnormality, the immobilizer 10 and the door lock control circuit 30 are started in accordance with the behavior of the in-vehicle monitoring circuit 20. When the operation portion 23 of the in-vehicle monitoring circuit 20 determines abnormality with checking in the vehicle, the in-vehicle monitoring circuit 20 sends the power supply ON signal of the immobilizer 10 and the door lock control circuit 30 to the communication portion 5 of the power supply control circuit 2. Then the power supply ON signal is sent to the immobilizer 10 and the door lock control circuit 30 through each control signal line from the power supply control portion 8 of the power supply control circuit 2. Herewith the switches of the immobilizer 10 and the door lock control circuit 30 are connected and the power supplies are turned on. Then the immobilizer 10 makes the ID accordance determination determining whether the ID of key corresponds to the ID of the vehicle. When the ID accordance determination is performed, the immobilizer 10 determines whether the ID of key corresponds to the ID of the vehicle. The in-vehicle monitoring circuit 20 checks the record that the door was unlocked. As a result, the in-vehicle monitoring circuit 20 determines that following cases are abnormal. The cases are that the door is unlocked from the interior of the vehicle, the door is not unlocked and the ID accordance determination is not performed, or the door is not unlocked and the IDs are disaccord. In this case, the in-vehicle monitoring circuit 20 makes the next starting time shorter than that of the normal case. For example, the in-vehicle monitoring circuit 20 is started up after a minute. When the in-vehicle monitoring circuit 20 starts up next time, the immobilizer 10 and the door lock control circuit 30 are started up in synchronization with the in-vehicle monitoring circuit 20. Then if the in-vehicle monitoring circuit 20 determines the abnormality again in next starting time of the in-vehicle monitoring circuit 20, the in-vehicle monitoring circuit 20 sends the abnormal signal to the engine ECU 40. The engine ECU 40 lights a hazard lighting or triggers an alarm to notify the abnormality.

According to the vehicle security apparatus 1 of the embodiment, the in-vehicle monitoring camera 26 takes an image of the in-vehicle after the vehicle is stopped and the door is locked. The operation portion 23 of the in-vehicle monitoring circuit 20 analyzes the taken images and determines the presence or absence of an abnormality based on whether there is a person in the vehicle. When the operation portion 23 detects a person and determines the abnormality, the operation portion 23 makes the next starting time of the in-vehicle monitoring circuit 20 shorter than that of the case where the operation portion 23 does not detect a person and determines the normality. More specifically, the next starting time of the in-vehicle monitoring circuit 20 is not unilaterally sent from the external device, but the in-vehicle monitoring circuit 20 itself can select the next starting time based on the result of the determination of the in-vehicle monitoring circuit 20. Since the in-vehicle monitoring circuit 20 itself can send the power supply ON/OFF signal, the power supply ON/OFF signal is not needed to be sent to the vehicle security apparatus 1 from the external device according to the result of determination of the in-vehicle monitoring circuit 20. Further, in the embodiment of the present invention, the in-vehicle monitoring circuit 20 operates while the vehicle is stopped. So, the power consumption can be reduced by turning off the power supply of the in-vehicle monitoring circuit 20 during the vehicle being driven.

According to the embodiment, when the user turns on the engine, the immobilizer 10 for determining ID accordance determination and the door lock control circuit 30 for controlling the door lock of the vehicle are started up. The immobilizer 10 and the door lock control circuit 30 may as well be started up when the operation portion 23 of the in-vehicle monitoring circuit 20 detects a person and determines the abnormality. More specifically, when the in-vehicle monitoring circuit 20 checks the in-vehicle and the operation portion 23 detects a person and determines the abnormality, the operation portion 23 sends the power supply ON signal of the immobilizer 10 and the door lock control circuit 30 to the power supply control circuit 2. Herewith the power supply ON signal is sent to the immobilizer 10 and the door lock control circuit 30 through each control signal line from the power supply control portion 8 of the power supply control circuit 2. Then each switch is connected and the power supply is turned on. Then the immobilizer 10 confirms the presence or absence of the ID accordance determination and the door lock control circuit 30 confirms the presence or absence of the record of the door being unlocked. When the operation portion 23 determines the abnormality, the operation portion 23 makes the next starting time shorter than that of the case where the operation portion 23 does not detect a person and determines the normality. When the determined time is elapsed, the power supply signal is sent to the in-vehicle monitoring circuit 20 to turn on the power supply. If the operation portion 23 detects a person and determines the abnormality again when the in-vehicle monitoring circuit 20 checks, alarm is triggered by the engine ECU 40 and so on, and the abnormality is notified to the user.

That is, the power supply control circuit 2 determines whether or not the immobilizer 10 and the door lock control circuit 30 are started up based on the result of the determination of the in-vehicle monitoring circuit 20. For this reason, the power consumption of the vehicle security apparatus 1 can be reduced compared with a case of making the immobilizer 10 and the door lock control circuit 30 operate constantly.

Second Embodiment

Figure 5:
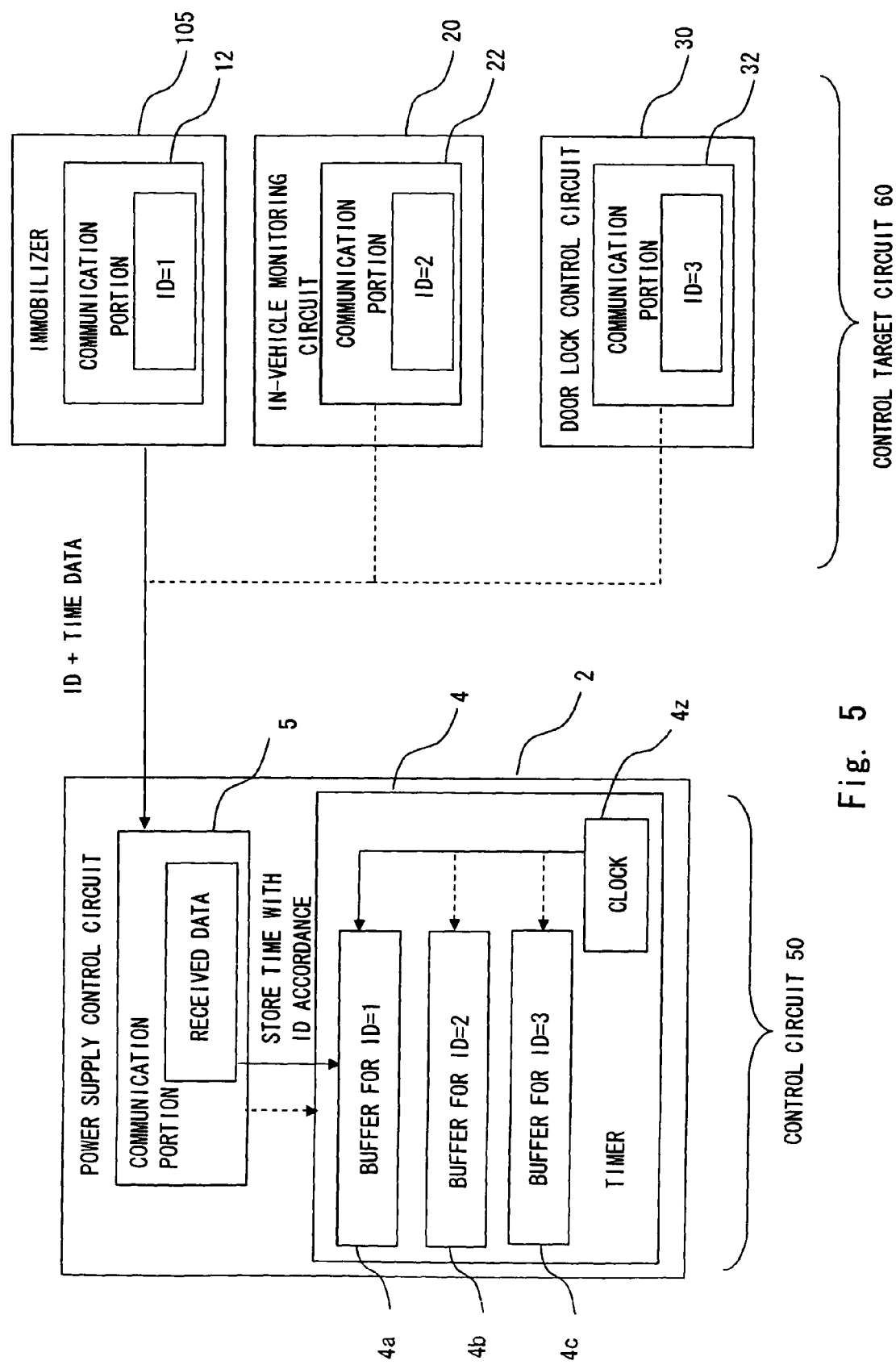
FIG. 5 is a block diagram showing a vehicle security apparatus according to a second embodiment of the present invention.

Next the second embodiment of the present invention will be described. In the first embodiment, where the in-vehicle monitoring circuit 20 detects abnormality or the user turns on the engine, the immobilizer 10 and the door lock control circuit 30 are started up. In this case, the immobilizer 10, the in-vehicle monitoring circuit 20, and the door lock control circuit 30 can be controlled independently. More specifically, for example, the immobilizer 10 can be started up in 10 minutes interval or the door lock control circuit 30 can be started up in 1 hour interval. Hereinafter the constitution of the vehicle security apparatus 1 of the second embodiment will be described with reference to FIG. 5. FIG. 5 is a partial block diagram showing the vehicle security apparatus 1 of the second embodiment. In the second embodiment, the same symbols are given to the same components to the vehicle security apparatus 1 of the first embodiment and the explanation thereof is omitted.

As shown in FIG. 5, in the vehicle security apparatus 1 of the embodiment, the timer 4 if the power supply control circuit 2 includes a plurality of built-in buffers which correspond to each part of the control target circuit 60 connected to the power supply control circuit 2. The built-in buffer is memory and stores the next starting time received from the corresponding control target circuit 60. According to the embodiment, the control target circuit 60 includes the immobilizer 10 (ID=1), the in-vehicle monitoring circuit 20 (ID=2), and the door lock control circuit 30 (ID=3), and built-in buffers 4a-4c which correspond to each part of the control target circuit 60 are set in the timer 4 of the power supply control circuit 2. The timer 4 further includes a clock 4z, and the clock 4z counts an elapsed time from the time receiving the next starting time sent from each part of the control target circuit 60.

More specifically, the timer 4 of the power supply control circuit 2 corresponds to the control target circuit 60, and the timer 4 has a plurality of built-in buffers which store each next starting time. ID (1) of the control target circuit 60 and the next starting time of the control target circuit 60 and so on are stored in the buffer 4a which corresponds to the timer 4 from the communication portion 12 of the immobilizer 10 which is the control target circuit 60 and has ID=1 through the communication portion 5 of the power supply control circuit 2. The clock 4z counts the elapsed time which is passed after receiving the ID of the immobilizer 10 and the next starting time. If the elapsed time corresponds to the next starting time which is stored in the buffer 4a, the power supply control portion 8 sends the corresponding power supply ON signal of the immobilizer 10 which has ID=1.

According to the vehicle security apparatus 1 of the embodiment, the timer 4 of the power supply control circuit 2 corresponds to the control target circuit 60 which includes the immobilizer 10, the in-vehicle monitoring circuit 20, and the door lock control circuit 30 for example, and has built-in buffers (for example buffers 4a-4c) which store each next starting time. Herewith the next starting time can be set for each part of the control target circuit 60. For this reason, any part of the control target circuit can be started up as desired. That is, the power consumption of the vehicle security apparatus 1 can further be reduced.

Note that the present invention is not limited to the above-described embodiment. Needless to say, various changes can be made without departing from the spirit of the present invention. For example, although we explained that ID of the next starting time of the control target circuit 60 is sent to the power supply control circuit 2 from each part of the control target circuit 60, the next starting time instead of the ID can be sent to the power supply control circuit 2. According to the embodiment, the operation portion 23 of the in-vehicle monitoring circuit 20 analyzes the result of taken images and determines the presence or absence of an abnormality based on the presence or absence of a person in a vehicle. Although we explained the next starting time of the in-vehicle monitoring circuit 20 in the case where the operation portion 23 determines normality is 5 minutes, the next starting time can be arbitrarily changed.

It is apparent that the present invention is not limited to the above embodiment but may be modified and changed without departing from the scope and spirit of the invention.

What is claimed is:

1. An intermittent driving system, comprising:
   a first control target circuit detecting a first security situation of a vehicle;
   a second control target circuit detecting a second security situation of said vehicle at a first interval time and outputting a first request signal for changing said first interval time to a second interval time to turn on said second control target circuit, said first request signal being determined by the second control target circuit in response to a result of said first security situation detected and a result of said second security situation detected; and
   a control circuit sending a power supply ON signal for turning on a power supply or a power supply OFF signal for turning off of the power supply of the second control target circuit based on the first request signal from the second control target circuit.

2. The intermittent driving system according to claim 1, wherein said second control target circuit outputs a second request signal for activating said first control target circuit in response to a result of the detected second security situation and said control circuit sends a power supply ON signal for turning on the power supply of the first control target circuit in response to the second request signal from the second control target circuit.

3. The intermittent driving system according to claim 2, wherein the second control target circuit outputs an ID indicating the first control target circuit with the second request signal, and said control circuit activates the first control target circuit based on the ID.

4. The intermittent driving system according to claim 1, wherein said control circuit has an information of a plurality of IDs corresponding to a plurality of said interval times and the second control target circuit outputs said ID corresponding to the second interval time as said first request signal.

5. The intermittent driving system according to claim 1, wherein the second control target circuit includes a door lock control circuit to control opening and closing a door based on a door lock signal or a door unlock signal.

6. The intermittent driving system according to claim 5, wherein upon detection by an in-vehicle monitoring circuit that there is abnormality in the vehicle based on an image taken by a monitoring camera, the in-vehicle monitoring circuit outputs said second request signal for activating said first control target circuit to said control circuit.

7. The intermittent driving system according to claim 6, wherein said first control target circuit includes an immobilizer to determine whether or not identifying information of a key corresponds to identifying information of a vehicle.

8. The intermittent driving system according to claim 7, wherein said first control target circuit further includes said door lock control circuit and/or said immobilizer.

9. The intermittent driving system according to claim 5, when an in-vehicle monitoring circuit detects that there is abnormality in the vehicle based on an image taken by a monitoring camera and receives the detected said first security situation from the first control target circuit, the in-vehicle monitoring circuit determines to change said first interval time to said second interval time for turning on said second control target circuit, the second interval time being shorter than the first interval time.

10. The intermittent driving system according to claim 9, wherein said first control target circuit further includes said door lock control circuit and/or an immobilizer.

11. The intermittent driving system according to claim 10, wherein said door lock control circuit unlocks the door based on a determination of whether the door is locked and outputs said second request signal for activating said immobilizer to said control circuit.

12. The intermittent driving system according to claim 5, wherein an in-vehicle monitoring circuit determines that a case where a person is detected in the vehicle is abnormal and a case where a person is not detected in the vehicle is normal while the vehicle is stopped and a door is locked.

13. The intermittent driving system according to claim 12, wherein said first control target circuit further includes said door lock control circuit and/or an immobilizer.

14. An intermittent driving system, comprising:

an in-vehicle monitoring circuit which detects a situation in a vehicle with a monitoring camera;

a door lock control circuit which detects whether a door is locked; and a control circuit which activates the door lock control circuit when an abnormal situation is detected, to check a record that the door was unlocked.

* * * * *